(12) United States Patent
Tokuyama et al.

(10) Patent No.: US 11,536,455 B2
(45) Date of Patent: Dec. 27, 2022

(54) COMBUSTOR COMPONENT, COMBUSTOR, GAS TURBINE, AND MANUFACTURING METHOD FOR COMBUSTOR COMPONENT

(71) Applicant: Mitsubishi Power, Ltd., Kanagawa (JP)

(72) Inventors: Kentaro Tokuyama, Yokohama (JP); Hiroaki Kishida, Yokohama (JP); Taiki Kinoshita, Yokohama (JP); Hiroki Shibata, Yokohama (JP); Toshinobu Ohara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/285,283

(22) PCT Filed: Nov. 1, 2019

(86) PCT No.: PCT/JP2019/043148
§ 371 (c)(1),
(2) Date: Apr. 14, 2021

(87) PCT Pub. No.: WO2020/095857
PCT Pub. Date: May 14, 2020

(65) Prior Publication Data
US 2021/0302017 A1   Sep. 30, 2021

(30) Foreign Application Priority Data

Nov. 9, 2018  (JP) .............................. JP2018-211009

(51) Int. Cl.
*F23R 3/00* (2006.01)
*F02C 7/22* (2006.01)
*F23R 3/44* (2006.01)

(52) U.S. Cl.
CPC ................ *F23R 3/002* (2013.01); *F02C 7/22* (2013.01); *F23R 3/44* (2013.01);
(Continued)

(58) Field of Classification Search
CPC .. F23R 3/002; F23R 3/44; F23R 2900/00014; F23R 2900/0018; F23R 2900/03042;
(Continued)

(56) References Cited

U.S. PATENT DOCUMENTS

| | | |
|---|---|---|
| 2013/0160453 A1 | 6/2013 | Kimura et al. |
| 2014/0190171 A1* | 7/2014 | Critchley ................ F23R 3/045 60/755 |
| 2019/0368381 A1* | 12/2019 | Greenwood ............ F01D 25/26 |

FOREIGN PATENT DOCUMENTS

| | | |
|---|---|---|
| JP | 2005-315457 | 11/2005 |
| JP | 2006-275054 | 10/2006 |

(Continued)

OTHER PUBLICATIONS

International Search Report dated Jan. 7, 2020 in International (PCT) Application No. PCT/JP2019/043148.
(Continued)

*Primary Examiner* — Ehud Gartenberg
*Assistant Examiner* — Nalini Emily Selladurai
(74) *Attorney, Agent, or Firm* — Wenderoth, Lind & Ponack, L.L.P.

(57) ABSTRACT

A combustor component according to at least one embodiment of the present invention includes a cylindrical body which internally includes a combustion chamber, and includes a weld part where a plurality of through holes opening to the combustion chamber are formed, and a housing which is disposed on an outer circumferential side of the cylindrical body to cover a part of the weld part, and defines an acoustic damping space communicating with the combustion chamber via at least one of the through holes. The plurality of through holes in the weld part has a formation density which is higher in a first region of the
(Continued)

weld part covered with the housing than in a second region of the weld part positioned outside the housing.

12 Claims, 10 Drawing Sheets

(52) U.S. Cl.
CPC .... *F05D 2230/232* (2013.01); *F05D 2240/35* (2013.01); *F05D 2250/231* (2013.01); *F05D 2260/232* (2013.01); *F05D 2260/96* (2013.01); *F23R 2900/00014* (2013.01); *F23R 2900/00018* (2013.01); *F23R 2900/03042* (2013.01)

(58) Field of Classification Search
CPC .. F23R 2900/03041; F23R 2900/03043; F23R 2900/03044; F23R 2900/00017; F23R 2900/00019; F05D 2250/231; F05D 2230/232; F05D 2240/35; F05D 2260/963; F05D 2260/964; F05D 2260/96
See application file for complete search history.

(56) References Cited

FOREIGN PATENT DOCUMENTS

| JP | 2006275054 A | * | 10/2006 |
| JP | 2007132640 A | * | 5/2007 |
| WO | 2013/077394 | | 5/2013 |
| WO | 2018/183078 | | 10/2018 |

OTHER PUBLICATIONS

Office Action dated Jun. 30, 2022 in corresponding German Application No. 11 2019 004 946.1, with English language translation.

* cited by examiner

VI — VI

VIII — VIII

Circumferential direction

COMBUSTOR COMPONENT, COMBUSTOR, GAS TURBINE, AND MANUFACTURING METHOD FOR COMBUSTOR COMPONENT

TECHNICAL FIELD

The present disclosure relates to a combustor component, a combustor, a gas turbine, and a manufacturing method for the combustor component.

BACKGROUND

A combustor in a gas turbine has a structure for cooling itself by compressed air or the like from a compressor, because a high-temperature combustion gas flows inside the combustor. As an example of the structure for cooling the combustor, it is possible to give, for example, a cooling passage which is disposed inside a wall of a cylindrical body constituting the combustor. It is possible to cool the cylindrical body by flowing the compressed air or the like through the cooling passage.

In general, the cylindrical body constituting the combustor is formed by joining a plurality of sections via a weld part. Thus, it is difficult to dispose the above-described cooling passage in the vicinity of the weld part.

In this regard, for example, Patent Document 1 describes that a refrigerant jacket for covering a weld part from an outer peripheral side of a transition piece of a combustor, and a cooling medium such as cooling air is flown into the refrigerant jacket, thereby cooling the vicinity of the weld part (see Patent Document 1).

CITATION LIST

Patent Literature

Patent Document 1: JP2006-275054A

SUMMARY

Technical Problem

However, in the combustor described in Patent Document 1, the refrigerant jacket needs to be mounted along the weld part, which may increase a manufacturing cost of the combustor.

In view of the above, an object of at least one embodiment of the present invention is to provide a combustor component capable of cooling the vicinity of the weld part with a simple configuration.

Solution to Problem (1) A combustor component according to at least one embodiment of the present invention includes a cylindrical body which internally includes a combustion chamber, and includes a weld part where a plurality of through holes opening to the combustion chamber are formed, and a housing which is disposed on an outer circumferential side of the cylindrical body to cover a part of the weld part, and defines an acoustic damping space communicating with the combustion chamber via at least one of the through holes. The plurality of through holes in the weld part has a formation density which is higher in a first region of the weld part covered with the housing than in a second region of the weld part positioned outside the housing.

The combustor component internally including the combustion chamber is a combustor component for a gas turbine, and as long as a purge hole is formed in the housing so that compressed air from a compressor can be introduced into the acoustic damping space, inflow of the compressed air to the combustion chamber is restricted by the purge hole of the housing even if the through holes are disposed in the above-described first region. However, the compressed air directly flows into the combustion chamber if the through holes are disposed in the above-described second region. Accordingly, disposing many through holes in the second region more than necessary is not preferable in terms of efficiency of the gas turbine. In this regard, with the above configuration (1), since the formation density of the through holes in the weld part is higher in the first region than in the second region, it is possible to cool the vicinity of the weld part where a temperature is likely to be high, while suppressing inflow of the compressed air to the combustion chamber. Moreover, the refrigerant jacket as described in Patent Document 1 need not additionally be provided, making it possible to cool the vicinity of the weld part with a simple configuration.

(2) In some embodiments, in the above configuration (1), the housing extends along a circumferential direction of the cylindrical body, and the weld part at least partially extends along an axial direction of the cylindrical body.

As described above, in general, the cylindrical body constituting the combustor is formed by joining a plurality of sections via the weld part. Moreover, if the cylindrical body has an acoustic hole causing the acoustic damping space and the combustion chamber to communicate with each other, in general, the acoustic hole is formed before the above-described plurality of sections are joined. Therefore, the acoustic hole is not often disposed in the vicinity of the weld part. If the housing extends along the circumferential direction of the cylindrical body, a plurality of acoustic holes are formed along the circumferential direction of the cylindrical body. However, if the weld part extends along the axial direction of the cylindrical body, a formation density of the acoustic holes is low in the vicinity of the weld part. Thus, a temperature difference occurs in the circumferential direction of the cylindrical body, which may cause a crack in the cylindrical body.

In this regard, with the above configuration (2), adopting the above configuration (1), it is possible to suppress occurrence of the crack. That is, in the above configuration (2), the formation density of the plurality of through holes in the weld part is higher in the first region of the weld part covered with the housing than in the second region of the weld part positioned outside the housing. Thus, in both of the region covered with the housing and the region uncovered with the housing, it is possible to suppress the temperature difference in the circumferential direction of the cylindrical body and to suppress occurrence of the crack.

(3) In some embodiments, in the above configuration (1) or (2), the acoustic damping space communicates with the combustion chamber via the through holes disposed in the first region of the weld part, and a plurality of acoustic holes disposed separately from the through holes in the cylindrical body and opening to the combustion chamber.

Even if the acoustic holes are disposed as in the above configuration (3), the acoustic hole is not often disposed in the vicinity of the weld part in the cylindrical body. Thus, between the region in the vicinity of the weld part and the region away from the weld part, as described above, the temperature difference occurs in the cylindrical body due to the formation density of the acoustic holes. In this regard, in the above configuration (3), since the through holes are formed in the first region of the weld part, it is possible to suppress the temperature difference in the cylindrical body caused by the formation density of the acoustic holes.

(4) In some embodiments, in the above configuration (3), at least some of the plurality of through holes are arranged at a first pitch along an axial direction of the cylindrical body, and at least some of the plurality of acoustic holes are arranged at a second pitch along the axial direction, the second pitch being not less than 70% and not greater than 130% of the first pitch.

With the above configuration (4), bringing the respective pitches of the through holes and the acoustic holes arranged along the axial direction of the cylindrical body close to each other, it is possible to suppress the temperature difference between the region in the vicinity of the weld part and the region away from the weld part.

(5) In some embodiments, in any one of the above configurations (1) to (4), the cylindrical body forms a plurality of cooling passages at intervals along a circumferential direction of the cylindrical body, the cooling passages extending along an axial direction of the cylindrical body inside a wall constituting the cylindrical body.

The interval between two cooling passages adjacent to each other across the weld part tends to be wider than the interval between two cooling passages adjacent to each other without across the weld part. Thus, the temperature difference between the region in the vicinity of the weld part and the region away from the weld part tends to widen.

In this regard, with the above configuration (5), having the above configuration (1), it is possible to cool the weld part and the vicinity thereof by the compressed air flowing through the through holes formed in the weld part, and to suppress the temperature difference between the region in the vicinity of the weld part and the region away from the weld part.

(6) In some embodiments, in the above configuration (5), the acoustic damping space communicates with the combustion chamber via the through holes disposed in the first region of the weld part, and a plurality of acoustic holes disposed separately from the through holes, and the plurality of acoustic holes are formed between two of the cooling passages adjacent to each other in the circumferential direction.

With the presence of the acoustic holes between the two adjacent cooling passages, the cylindrical body is further cooled. However, as described above, the acoustic hole is not often disposed in the vicinity of the weld part in the cylindrical body. Thus, the temperature difference between the region in the vicinity of the weld part and the region away from the weld part tends to widen. In this regard, with the above configuration (6), having the above configuration (1), it is possible to cool the weld part and the vicinity thereof by the compressed air flowing through the through holes, and to suppress the temperature difference between the region in the vicinity of the weld part and the region away from the weld part.

(7) In some embodiments, in the above configuration (5) or (6), an interval between two of the cooling passages adjacent to each other in the circumferential direction across the weld part is larger than an interval between two of the cooling passages adjacent to each other in the circumferential direction without across the weld part.

As the interval between the two adjacent cooling passages increases, the temperature of the cylindrical body tends to be high. Thus, if the interval between the two cooling passages adjacent to each other in the circumferential direction across the weld part is larger than the interval between the two cooling passages adjacent to each other in the circumferential direction without across the weld part, the temperature difference between the region in the vicinity of the weld part and the region away from the weld part widens.

In this regard, with the above configuration (7), having the above configuration (1), it is possible to cool the weld part and the vicinity thereof by the compressed air flowing through the through holes, and to suppress the temperature difference between the region in the vicinity of the weld part and the region away from the weld part.

(8) In some embodiments, in any one of the above configurations (1) to (7), the plurality of through holes are formed only in the first region.

As described above, the compressed air directly flows into the combustion chamber if the through holes are disposed in the above-described second region. Thus, disposing many through holes in the second region more than necessary is not preferable in terms of efficiency of the gas turbine. In this regard, with the above configuration (8), since the through holes are not disposed in the second region, it is possible to suppress a decrease in efficiency of the gas turbine.

(9) A combustor component according to at least one embodiment of the present invention includes a cylindrical body forming a plurality of weld parts for welding, along an axial direction, circumferential end portions of a plurality of plate-like sections divided in a circumferential direction, respectively and internally forming a tubular combustion chamber, and a housing covering the cylindrical body from an outer circumferential side along the circumferential direction. In each of the plurality of sections, the cylindrical body forms a plurality of acoustic hole rows in the circumferential direction each in which a plurality of acoustic holes opening to a combustor are disposed in a row in the axial direction. The housing covers the plurality of acoustic hole rows, as well as covers a part of a corresponding one of the plurality of sections and a part of a corresponding one of the plurality of weld parts, and defines an acoustic damping space for damping a combustion oscillation in communication with the combustion chamber via the acoustic hole rows. In the part of the corresponding one of the plurality of weld parts covered with the housing, a plurality of through holes are formed along the axial direction.

As described above, the combustor component is the combustor component for the gas turbine, and as long as the purge hole is formed in the housing so that the compressed air from the compressor can be introduced into the acoustic damping space, inflow of the compressed air to the combustion chamber is restricted by the purge hole of the housing even if the through holes are disposed in the weld part covered with the housing. Thus, it is possible to suppress inflow of the compressed air to the combustion chamber. Therefore, with the above configuration (9), it is possible to cool the vicinity of the weld part where the temperature is likely to be high, while suppressing inflow of the compressed air to the combustion chamber. Moreover, the refrigerant jacket as described in Patent Document 1 need not additionally be provided, making it possible to cool the vicinity of the weld part with the simple configuration.

(10) A combustor according to at least one embodiment of the present invention includes a burner for combusting fuel, and the combustor component according to any one of the above configurations (1) to (9).

With the above configuration (10), including the combustor component according to the above configuration (1), it is possible to cool the vicinity of the weld part where the temperature is likely to be high, while suppressing inflow of the compressed air to the combustion chamber. Moreover, the refrigerant jacket as described in Patent Document 1 need not additionally be provided, making it possible to cool the vicinity of the weld part with the simple configuration.

(11) A gas turbine according to at least one embodiment of the present invention includes a compressor for generating compressed air, the combustor according to the above configuration (10), and a turbine which is rotary driven by a combustion gas generated by the combustor.

With the above configuration (11), including the combustor according to the above configuration (10), it is possible to cool the vicinity of the weld part where the temperature is likely to be high, while suppressing inflow of the compressed air to the combustion chamber. Moreover, the refrigerant jacket as described in Patent Document 1 need not additionally be provided, making it possible to cool the vicinity of the weld part with the simple configuration.

(12) A manufacturing method for a combustor component according to at least one embodiment of the present invention includes a step of forming a cylindrical body internally including a combustion chamber, by joining a plurality of sections via a weld part, a step of forming a plurality of through holes opening to the combustion chamber in the weld part, and a step of disposing a housing on an outer circumferential side of the cylindrical body to cover a part of the weld part, the housing defining an acoustic damping space communicating with the combustion chamber via at least one of the through holes. The plurality of through holes in the weld part has a formation density which is higher in a first region of the weld part covered with the housing than in a second region of the weld part positioned outside the housing.

As described above, the compressed air directly flows into the combustion chamber if the through holes are disposed in the above-described second region. Thus, disposing many through holes in the second region more than necessary is not preferable in terms of efficiency of the gas turbine. In this regard, with the above method (12), since the formation density of the through holes in the weld part is higher in the first region than in the second region, it is possible to manufacture the combustor component capable of cooling the vicinity of the weld part where the temperature is likely to be high, while suppressing inflow of the compressed air to the combustion chamber. Moreover, the refrigerant jacket as described in Patent Document 1 need not additionally be provided, making it possible to manufacture the combustor component capable of cooling the vicinity of the weld part with the simple configuration.

Advantageous Effects

According to at least one embodiment of the present invention, it is possible to provide a combustor component capable of cooling the vicinity of a weld part with a simple configuration.

DETAILED DESCRIPTION

Figure 1:
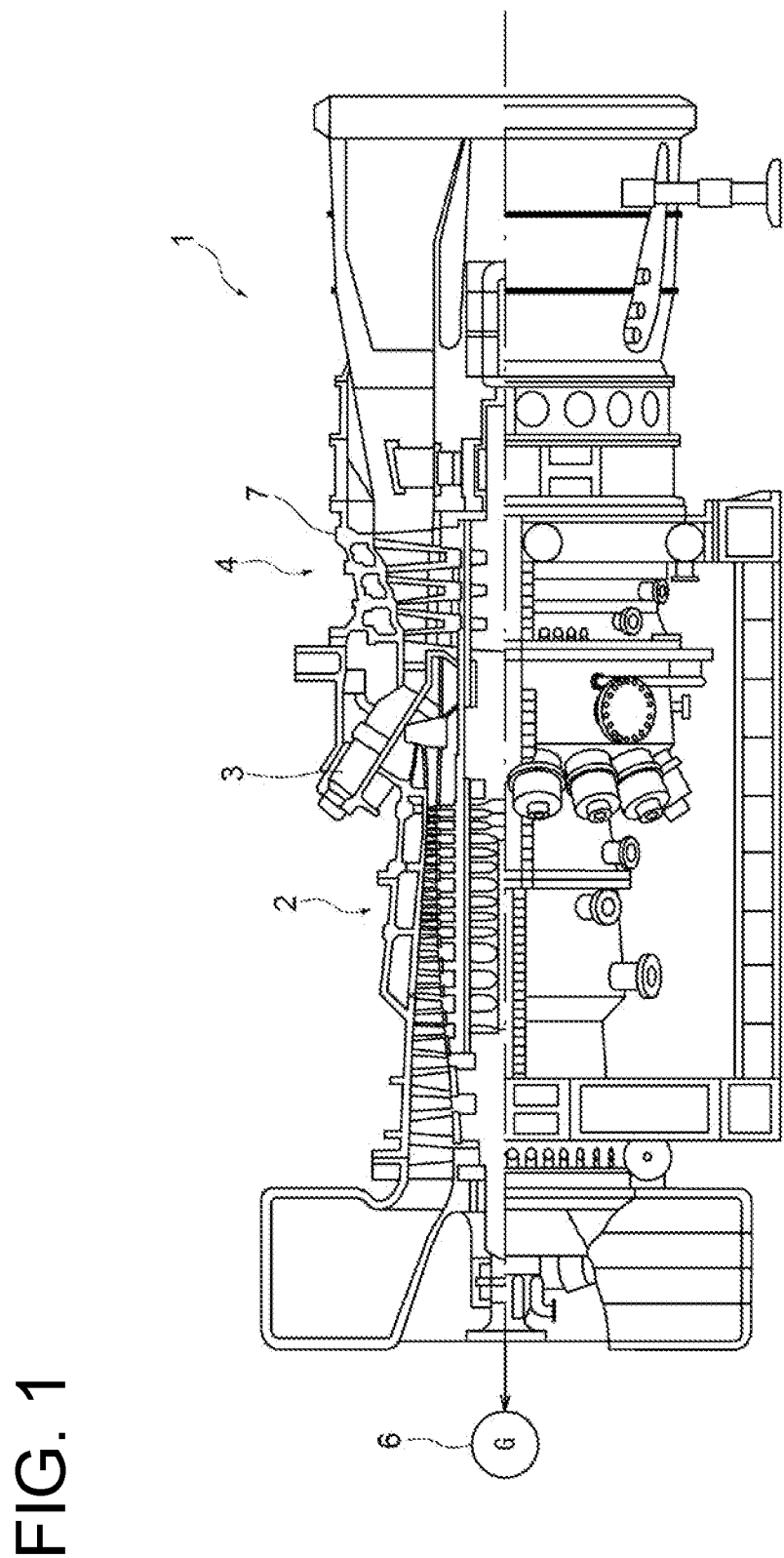
FIG. 1 is a schematic configuration view of a gas turbine according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

FIG. 1 is a schematic configuration view of a gas turbine 1 according to an embodiment of the present invention. As shown in FIG. 1, the gas turbine 1 according to the present embodiment includes a compressor 2, a combustor 3, and a turbine 4 and drives an external device such as a generator 6.

The compressor 2 sucks in and compresses atmosphere which is external air and supplies the compressed air to at least one combustor 3.

The combustor 3 combusts fuel supplied from outside with air compressed by the compressor 2, thereby producing a high-temperature gas (combustion gas).

The turbine 4 generates a rotational driving force in response to supply of the high-temperature gas produced by the combustor 3, and outputs the generated rotational driving force to the compressor 2 and the external device.

Figure 2:
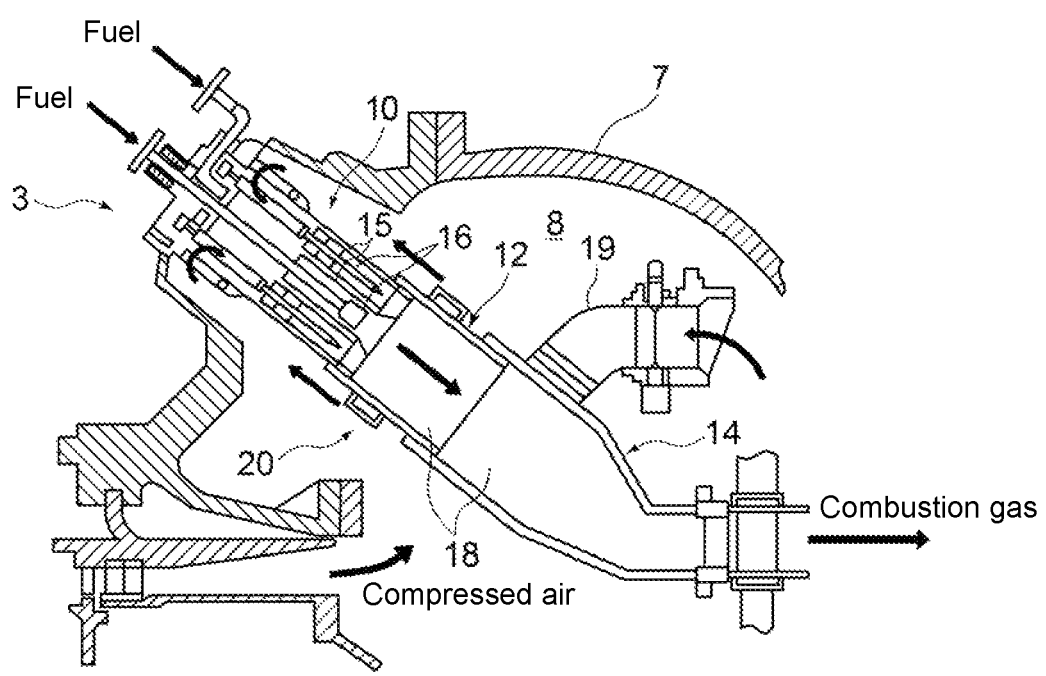
FIG. 2 is a diagram for describing a peripheral configuration of a combustor of the gas turbine.

FIG. 2 is a view for describing a peripheral configuration of the combustor 3 of the gas turbine 1. As shown in FIG.

2, in a casing 7 of the gas turbine 1, a combustor installation space 8 is disposed. The combustor installation space 8 is disposed between an outlet of the compressor 2 and an inlet of the turbine 4. The combustor 3 is disposed in the combustor installation space 8, and the compressed air flows into the combustor 3 from one end side of the combustor 3. On the other hand, the combustor 3 is supplied with fuel from outside.

Figure 3:
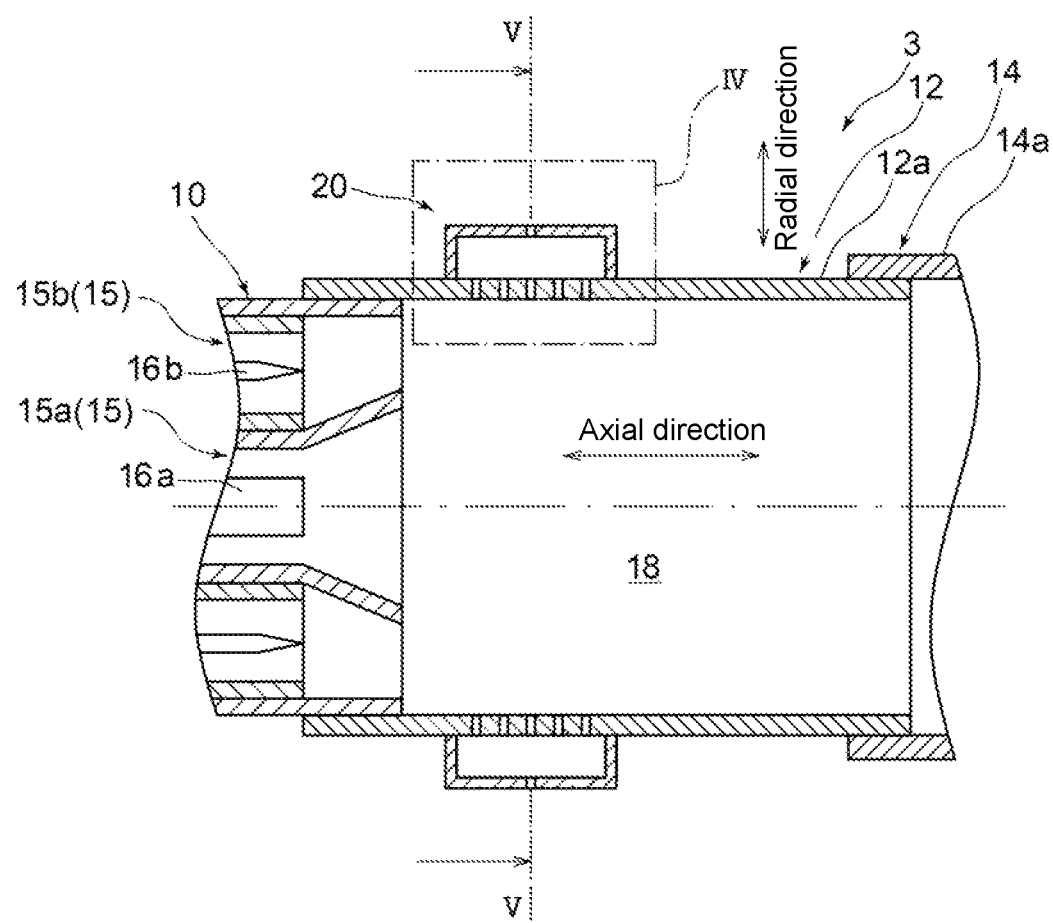
FIG. 3 is a vertical cross-sectional view schematically showing an acoustic device according to an embodiment, along with the periphery of a combustion liner of the combustor.

More specifically, the combustor 3 includes, as combustor components, a nozzle portion 10, a combustion liner 12, and a transition piece 14. The nozzle portion 10 has at least one burner 15 with a nozzle 16 for injecting the fuel supplied from outside toward inside the combustion liner 12. FIG. 3 is a schematic view showing a cross-section in the vicinity of the combustion liner 12 along the axial direction of the combustion liner 12. As shown in FIG. 3, the burner 15 includes, for example, one pilot burner 15a with a pilot nozzle 16a, and a plurality of main burners 15b disposed concentrically around the pilot burner 15a and each including a main nozzle 16b.

The combustion liner 12 has a tubular shape and is a cylindrical body 12a having a cylindrical shape, for example. The combustion liner 12 is coupled to the nozzle portion 10 on one end side (upstream end side) thereof.

The transition piece 14 is a tubular body 14a having a tubular shape and coupled to another end side (downstream end side) of the combustion liner 12. The cross-sectional shape of the transition piece 14 gradually changes in the axis direction of the combustor 3, in other words, a flow direction of the combustion gas. The transition piece 14 connects the combustion liner 12 to the inlet of the turbine 4.

The cylindrical body 12a and the tubular body 14a internally include a combustion chamber 18 where the fuel injected from the nozzle 16 is combusted. The combustion chamber 18 is supplied with the compressed air via gaps between the nozzles 16 or a bypass duct 19 shown in FIG. 2, and the fuel reacts with the compressed air to be combusted, generating the combustion gas.

As will be described later, the combustion liner 12 and the transition piece 14 according to some embodiments form a plurality of cooling passages 40, which extend along the axial direction of the cylindrical body 12a, the tubular body 14a inside a wall constituting the cylindrical body 12a, the tubular body 14a, at intervals along the circumferential direction of the cylindrical body 12a, the tubular body 14a.

The gas turbine 1 according to an embodiment includes an acoustic device 20 mounted to the combustor 3.

FIG. 3 is a vertical cross-sectional view schematically showing the acoustic device 20 according to an embodiment, along with the periphery of the combustion liner 12 of the combustor 3.

Figure 4:
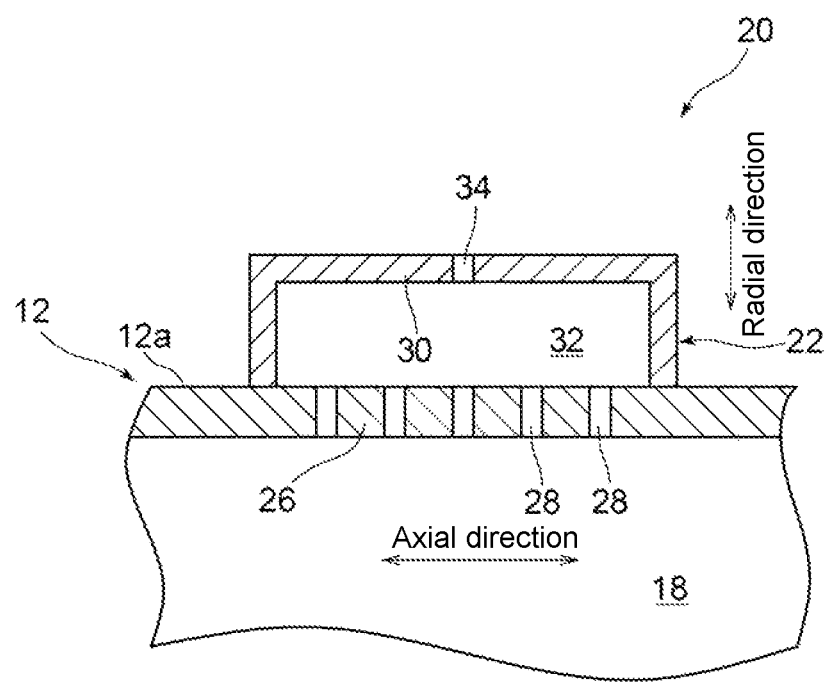
FIG. 4 is an enlarged partial cross-sectional view of a region IV in FIG. 3.

FIG. 4 is an enlarged partial cross-sectional view of a region IV in FIG. 3.

Figure 5:
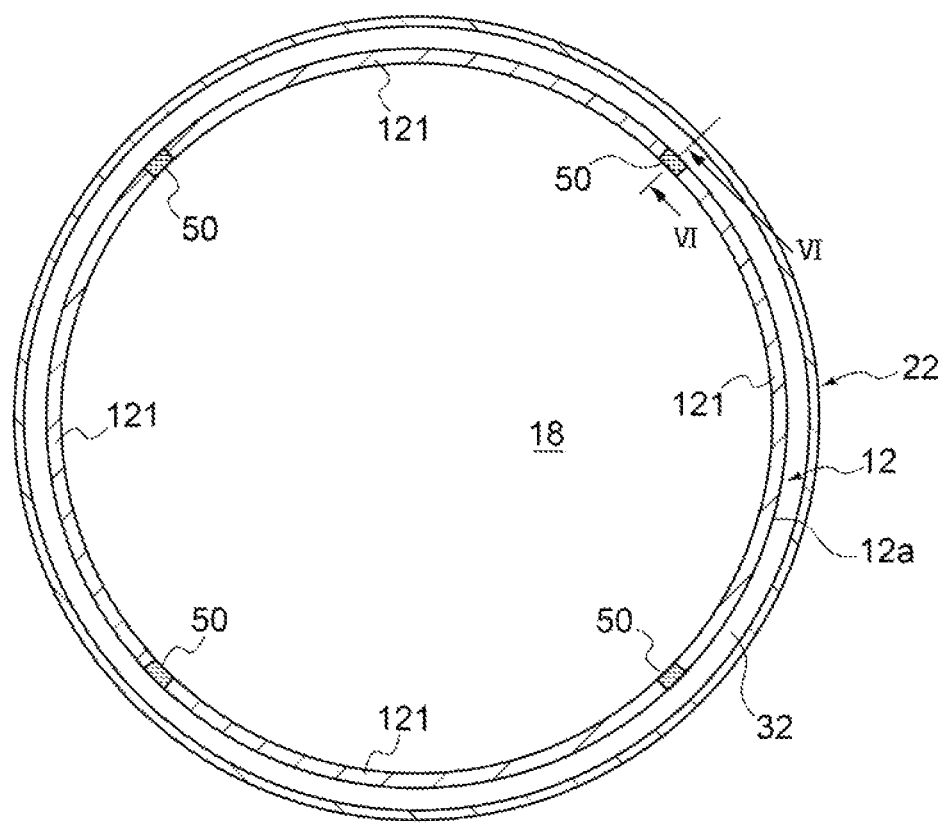
FIG. 5 is a schematic cross-sectional view taken along line V-V in FIG. 3.

FIG. 5 is a schematic cross-sectional view taken along line V-V in FIG. 3. FIG. 5 does not show the cooling passages 40, an acoustic hole 28, and a through hole 51 to be described later.

Figure 6:
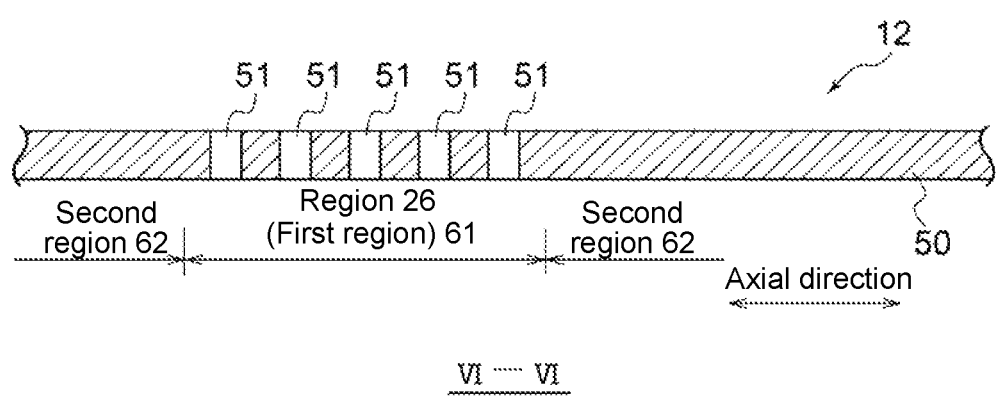
FIG. 6 is a cross-sectional view taken along line VI-VI in FIG. 5.

FIG. 6 is a cross-sectional view taken along line VI-VI in FIG. 5. FIG. 6 shows a cross-section of a weld part 50 to be described later.

Figure 7:
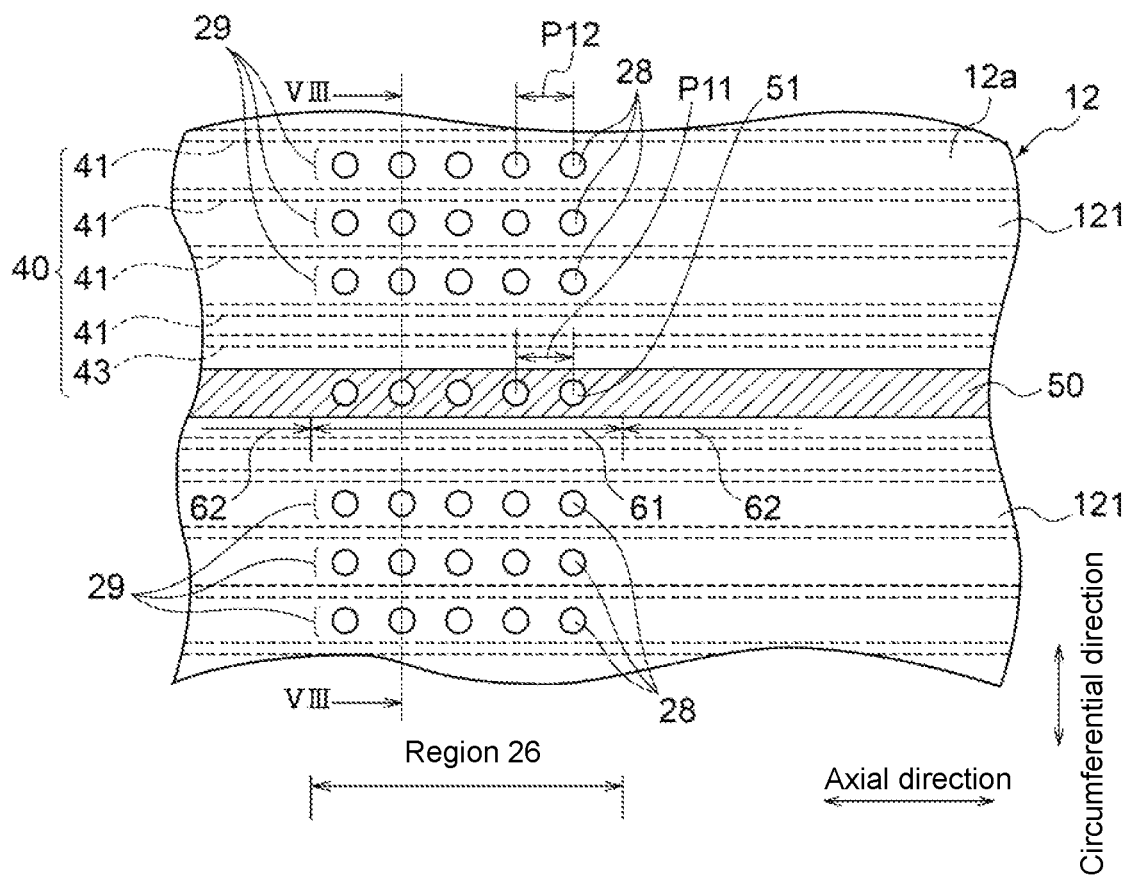
FIG. 7 is a view showing a partial region of an outer circumferential surface of the combustion liner as viewed from the radially outer side.

FIG. 7 is a view showing a partial region of an outer circumferential surface of the combustion liner 12 as viewed from the radially outer side. FIG. 7 is a view showing the partial region of the outer circumferential surface of the combustion liner 12 including the weld part 50, and shows a state before a housing 22 to be described later of the acoustic device 20 is mounted.

Figure 8:
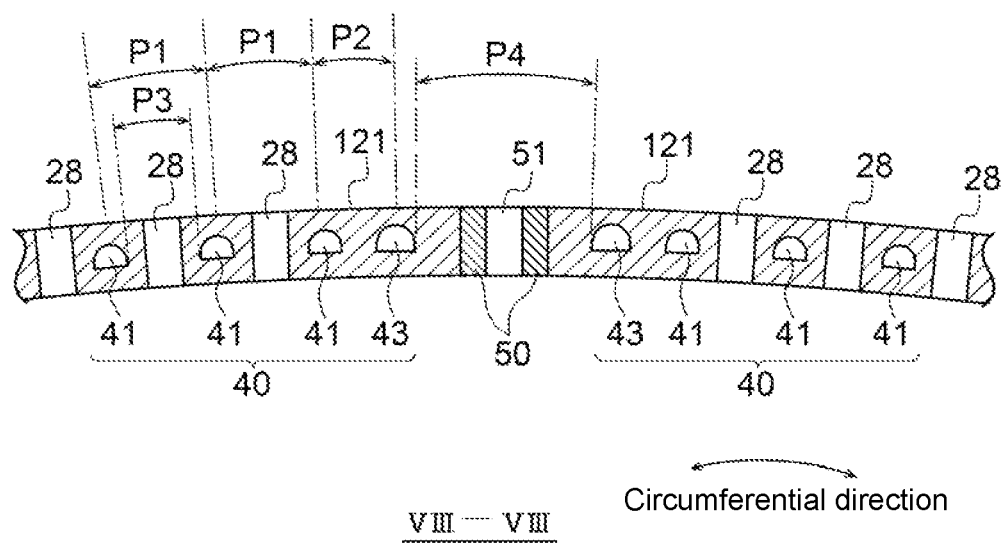
FIG. 8 is a cross-sectional view taken along line VIII-VIII in FIG. 7.

FIG. 8 is a cross-sectional view taken along line VIII-VIII in FIG. 7, and is a view showing a partial cross-section of the cylindrical body 12a as viewed from the axial direction of the combustion liner 12.

Figure 9:
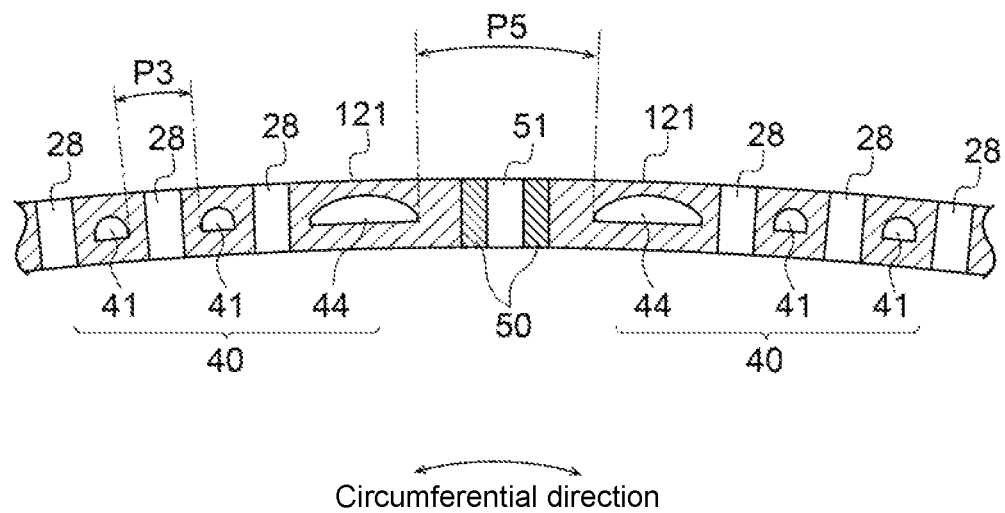
FIG. 9 is a view showing a partial cross-section of the cylindrical body as viewed from the axial direction of the combustion liner according to another embodiment.

FIG. 9 is a view showing a partial cross-section of the cylindrical body 12a as viewed from the axial direction of the combustion liner 12 according to another embodiment.

As shown in FIGS. 3 to 5, the acoustic device 20 includes the housing 22 and the acoustic hole 28. The combustion liner 12 includes a region 26 covered with the housing 22. In the region 26, at least one acoustic hole 28 is formed. For example, a plurality of acoustic holes 28 are formed in the region 26, and each acoustic hole 28 has a circular cross-sectional shape. As clearly shown in FIG. 7, in some embodiments, in each of a plurality of sections 121 to be described later, an acoustic hole row 29 is formed in which the plurality of acoustic holes 28 opening to the combustor 3 are disposed in a row in the axial direction. A plurality of acoustic hole rows 29 are formed in the circumferential direction.

The housing 22 is disposed on the outer circumferential side of the cylindrical body 12a to cover a part of the weld part 50 to be described later, and defines an acoustic damping space 32 communicating with the combustion chamber 18 via the acoustic hole 28. The housing 22 extends along the circumferential direction of the cylindrical body 12a and covers the cylindrical body 12a from the outer circumferential side along the circumferential direction. That is, the housing 22 covers the plurality of acoustic hole rows 29, as well as covers a part of a corresponding one of the plurality of sections 121 and a part of a corresponding one of the plurality of weld parts 50, and defines the acoustic damping space where a combustion oscillation is damped in communication with the combustion chamber 18 via the acoustic hole rows 29.

The housing 22 is fixed to the combustion liner 12 by, for example, welding.

In the housing 22, a plurality of purge holes 34 for introducing the compressed air from the compressor 2 to the acoustic damping space 32 are formed.

In the gas turbine 1 according to an embodiment, the acoustic device 20 of an embodiment mounted to the combustor 3 damps a pressure fluctuation in the combustor 3 caused by combustion oscillation. In the example shown in each of FIGS. 3 to 5, the acoustic device 20 according to an embodiment is provided for the combustion liner 12. However, the acoustic device 20 according to an embodiment may be provided for the combustion liner 12 and the transition piece 14, may be provided only for the combustion liner 12, or may be provided only for the transition piece 14.

The acoustic device 20 according to an embodiment is a so-called acoustic device referred to as an acoustic liner, and can absorb a sound of relatively high frequency caused by combustion oscillation. However, the acoustic device 20 may be an acoustic damper capable of absorbing a sound of relatively low frequency caused by combustion oscillation. Moreover, an acoustic damper (not shown) may be disposed together with the acoustic device 20 according to an embodiment.

In the following description, a description will mainly be given by taking the acoustic device 20 provided for the combustion liner 12 as an example, and a description in a case in which the acoustic device 20 is provided for the transition piece 14 may be omitted. However, the case in which the acoustic device 20 is provided for the transition piece 14 is the same as the case in which the acoustic device 20 is provided for the combustion liner 12.

As described above, the plurality of purge holes 34 are formed in the housing 22. The compressed air flowing into the acoustic damping space 32 from the purge holes 34 flows into the combustion chamber 18 via the plurality of acoustic holes 28. Thus, the compressed air flows through the plurality of acoustic holes 28, thereby cooling the inner circumferential surface of each of the acoustic holes 28. In addition, the compressed air flowing into the combustion chamber 18 from the acoustic holes 28 performs film cooling of the inner circumferential surface of the cylindrical body 12a.

Moreover, as described above, as shown in FIGS. 7 to 9, the combustion liner 12 and the transition piece 14 according to some embodiments form the plurality of cooling passages 40, which extend along the axial direction of the cylindrical body 12a, the tubular body 14a inside the wall constituting the cylindrical body 12a, the tubular body 14a, at intervals along the circumferential direction of the cylindrical body 12a, the tubular body 14a. FIGS. 7 to 9 show the cooling passages 40 formed in the cylindrical body 12a of the combustion liner 12, and the same also applies to the tubular body 14a of the transition piece 14.

The acoustic hole 28 is formed between the two cooling passages 40 adjacent to each other in the circumferential direction.

Meanwhile, in the combustion liner 12 according to some embodiments, for example, as shown in FIG. 5, the plurality of sections 121 are joined via the weld parts 50, respectively, thereby forming the cylindrical body 12a internally including the combustion chamber 18. That is, the cylindrical body 12a forms the plurality of weld parts 50 for welding, along the axial direction, the circumferential end portions of the plurality of plate-like sections 121 divided in the circumferential direction, respectively and internally forms the tubular combustion chamber 18.

As clearly shown in FIG. 7, the weld part 50 at least partially extends along the axial direction of the cylindrical body 12a.

As with the transition piece 14 according to some embodiments, a plurality of sections are joined via the weld parts, respectively, thereby forming the tubular body 14a internally including the combustion chamber 18. The weld part 50 in the tubular body 14a of the transition piece 14 at least partially extends along the axial direction of the tubular body 14a.

As described above, since the cylindrical body 12a and the tubular body 14a include the weld parts 50, it is difficult to dispose the cooling passages 40 in the vicinity of the end portions of the respective sections 121 to be joined by welding. That is, between the circumferential end portions of the respective sections 121 to be joined by welding, and cooling passages 43 in FIG. 8 and cooling passages 44 in FIG. 9 which are the cooling passages 40 closest to the end portions, it is necessary to ensure a minimum distance needed to prevent damage to the cooling passages 43, 44 caused by welding.

In other words, since the cooling passages 43, 44 closest to the end portions are disposed to be closer to the end portions as much as possible, it is also difficult to respectively dispose the acoustic holes 28 between the end portions and the cooling passages 43, 44 in advance before the respective sections 121 are joined by welding. Thus, an interval between the acoustic holes 28 adjacent to each other across the weld part 50 is wider than an interval between the acoustic holes 28 adjacent to each other without across the weld part 50, making it also difficult to obtain an effect of film cooling by the compressed air flowing into the combustion chamber 18 from the acoustic holes 28 in a region in the vicinity of the weld part 50.

Thus, conventionally, as shown in FIG. 8, 9, the cooling passages 43, 44 closest to the end portions may be formed to be larger in flow passage cross-sectional area than other cooling passages 41. In the cooling passages 43 shown in FIG. 8, an arrangement pitch P2 between the cooling passage 43 and the adjacent cooling passage 41 is narrower than an arrangement pitch P1 between the other cooling passages 41 adjacent to each other. Moreover, the cooling passages 44 shown in FIG. 9 are formed to be further larger in flow passage cross-sectional area than the cooling passages 43 shown in FIG. 8.

As shown in FIG. 8, 9, even if the cooling passages 43, 44 are formed to be larger in flow passage cross-sectional area than the other cooling passages 41, an interval P4, P5 between the cooling passages 43, 44 adjacent to each other across the weld part 50 is often larger than an interval P3 between the cooling passages 41 adjacent to each other without across the weld part 50. Thus, conventionally, in the cylindrical body 12a, a temperature difference occurs along the circumferential direction between a region in the vicinity of the weld part 50 and a region away from the weld part 50.

Thus, in some embodiments, as clearly shown in FIG. 8, 9, in the weld part 50, a plurality of through holes 51 opening to the combustion chamber 18 are disposed. Consequently, the compressed air from the compressor 2 supplied to the combustor installation space 8 can flow into the combustion chamber 18 via the plurality of through holes 51. Thus, the compressed air flows through the plurality of acoustic holes 51, thereby cooling the inner circumferential surface of each of the through holes 51. In addition, the compressed air flowing into the combustion chamber 18 from the through holes 51 performs film cooling of the inner circumferential surface of the cylindrical body 12a. Thus, with the compressed air, it is possible to cool the region in the vicinity of the weld part 50 where the temperature is likely to be higher than in the region away from the weld part 50. In some embodiments, a hole diameter of each of the through holes 51 is equal to that of the acoustic hole 28, but may be different from that of the acoustic hole 28.

As shown in FIG. 6, 7, a region of the weld part 50 covered with the housing 22 will be referred to as a first region 61, and a region of the weld part 50 positioned outside the housing 22 will be referred to as a second region 62.

If the through holes 51 are formed in the first region 61, the compressed air from the compressor 2 supplied to the combustor installation space 8 directly flows into the combustion chamber via the through holes 51 and the purge hole 34 of the housing 22.

On the other hand, if the through holes 51 are formed in the second region 62, the compressed air from the compressor 2 supplied to the combustor installation space 8 directly flows into the combustion chamber directly via the through holes 51.

That is, inflow of the compressed air to the combustion chamber 18 is restricted by the purge hole 34 of the housing 22 even if the through holes 51 are disposed in the first region 61, whereas the compressed air directly flows into the combustion chamber 18 if the through holes 51 are disposed in the second region 62. Accordingly, disposing many through holes 51 in the second region 62 more than necessary is not preferable in terms of efficiency of the gas turbine 1.

Thus, in some embodiments, the plurality of through holes 51 are formed in a part of the corresponding one of the plurality of weld parts 50 covered with the housing 22, that is, in the first region 61 along the axial direction. In some embodiments, the plurality of through holes 51 are formed such that a formation density of the plurality of through holes 51 in the weld part 50 is higher in the above-described first region 61 than in the above-described second region 62.

Thus, it is possible to cool the vicinity of the weld part 50 where the temperature is likely to be high, while suppressing inflow of the compressed air to the combustion chamber 18. Moreover, since the configuration need not be adopted in which the refrigerant jacket for covering the weld part 50 from the outer circumferential side of the combustion liner 12 along the extending direction of the weld part 50 is disposed, and the compressed air or the like is caused to flow in the refrigerant jacket, it is possible to cool the vicinity of the weld part 50 with the simple configuration.

As described above, the cylindrical body 12$a$ is formed by joining the plurality of sections 121 via the weld part 50. Moreover, in general, the acoustic hole 28 is formed before the above-described plurality of sections 121 are joined. Therefore, conventionally, the acoustic hole 28 is not often disposed in the vicinity of the weld part 50. The plurality of acoustic holes 28 are formed along the circumferential direction of the cylindrical body 12$a$ which is the extending direction of the housing 22. Therefore, a formation density of the acoustic holes 28 is low in the vicinity of the weld part 50. Thus, a temperature difference occurs in the circumferential direction of the cylindrical body 12$a$, which may cause a crack in the cylindrical body 12$a$.

In this regard, in some embodiments described above, since the housing 22 extends along the circumferential direction of the cylindrical body 12$a$, and the weld part 50 at least partially extends along the axial direction of the cylindrical body 12$a$, it is possible to suppress occurrence of the above-described crack.

That is, in some embodiments described above, the formation density of the plurality of through holes 51 in the weld part 50 is higher in the first region 61 than in the second region 62.

Consequently, in the region 26 covered with the housing 22, a relatively large number of through holes 51 are formed in the vicinity of the weld part 50 where the formation density of the acoustic holes 28 is low. Thus, non-uniformity in formation density of the holes communicating with the combustion chamber 18, that is, the acoustic holes 28 and the through holes 51 in the region 26 is suppressed, suppressing the temperature difference in the circumferential direction of the cylindrical body 12$a$ and suppressing occurrence of the crack.

In addition, since the acoustic holes 28 are hardly formed in a region uncovered with the housing 22, non-uniformity in formation density of the holes communicating with the combustion chamber 18 in the concerned region is suppressed even if a relatively small number of through holes 51 are formed in the weld part 50, suppressing the temperature difference in the circumferential direction of the cylindrical body 12$a$ and suppressing occurrence of the crack.

In some embodiments, the acoustic damping space 32 communicates with the combustion chamber 18 via the through holes 51 disposed in the first region 61 of the weld part 50, and the plurality of acoustic holes 28 disposed separately from the through holes 51 in the cylindrical body 12$a$ and opening to the combustion chamber 18.

As described above, the acoustic hole 28 is not often disposed in the vicinity of the weld part 50 in the cylindrical body 12$a$. Thus, between the region in the vicinity of the weld part 50 and the region away from the weld part 50, as described above, the temperature difference occurs in the cylindrical body 12$a$ due to the formation density of the acoustic holes 28. In this regard, in some embodiments, since the through holes 51 are formed in the first region 61 of the weld part 50, it is possible to suppress the temperature difference in the cylindrical body 12$a$ caused by the formation density of the acoustic holes 28.

In some embodiments, as shown in FIG. 7, at least some of the plurality of through holes 51 are arranged at a first pitch $P11$ along the axial direction of the cylindrical body 12$a$. Moreover, in some embodiments, at least some of the plurality of acoustic holes 28 are arranged at a second pitch $P12$ ($0.7 \times P11 < P12 < 1.3 \times P$) which is not less than 70% and not greater than 130% of the first pitch along the axial direction.

Thus, bringing the respective pitches of the through holes 51 and the acoustic holes 28 arranged along the axial direction of the cylindrical body 12$a$ close to each other, it is possible to suppress the temperature difference between the region in the vicinity of the weld part 50 and the region away from the weld part 50.

As described above, in some embodiments, the cylindrical body 12$a$ forms the plurality of cooling passages 40, which extend along the axial direction of the cylindrical body 12$a$ inside the wall constituting the cylindrical body 12$a$, at intervals along the circumferential direction of the cylindrical body 12$a$.

As described above, the interval $P4$, $P5$ between the two cooling passages 43, 44 adjacent to each other across the weld part 50 tends to be wider than the interval $P3$ between the two cooling passages 41 adjacent to each other without across the weld part 50. Thus, the temperature difference between the region in the vicinity of the weld part 50 and the region away from the weld part 50 tends to widen.

In this regard, according to some embodiments, it is possible to cool the weld part 50 and the vicinity thereof by the compressed air flowing through the through holes 51 formed in the weld part 50, and to suppress the temperature difference between the region in the vicinity of the weld part 50 and the region away from the weld part 50.

In some embodiments, the acoustic damping space 32 communicates with the combustion chamber 18 via the through holes 51 disposed in the first region 61 of the weld part 50, and the plurality of acoustic holes 28 disposed separately from the through holes 51.

Moreover, in some embodiments, the plurality of acoustic holes 28 are formed between the two cooling passages 40 adjacent to each other in the circumferential direction.

With the presence of the acoustic holes 28 between the two adjacent cooling passages 40, the cylindrical body 12$a$ is further cooled. However, as described above, the acoustic hole 28 is not often disposed in the vicinity of the weld part 50 in the cylindrical body 12$a$. Thus, the temperature difference between the region in the vicinity of the weld part 50 and the region away from the weld part 50 tends to widen. In this regard, according to some embodiments, it is possible to cool the weld part 50 and the vicinity thereof by the compressed air flowing through the through holes 51, and to suppress the temperature difference between the region in the vicinity of the weld part 50 and the region away from the weld part 50.

In the embodiments, as described above, the interval $P4$, $P5$ between the two cooling passages 43, 44 adjacent to each other across the weld part 50 is larger than the interval $P3$ between the two cooling passages 41 adjacent to each other in the circumferential direction without across the weld part 50.

As the interval between the two adjacent cooling passages 40 increases, the temperature of the cylindrical body 12*a* tends to be high. Thus, if the interval P4, P5 between the two cooling passages 43, 44 adjacent to each other in the circumferential direction across the weld part 50 is larger than the interval P3 between the two cooling passages 41 adjacent to each other in the circumferential direction without across the weld part 50, the temperature difference between the region in the vicinity of the weld part 50 and the region away from the weld part 50 widens.

In this regard, according to some embodiments described above, it is possible to cool the weld part 50 and the vicinity thereof by the compressed air flowing through the through holes 51, and to suppress the temperature difference between the region in the vicinity of the weld part 50 and the region away from the weld part 50.

In some embodiments, the plurality of through holes 51 may be formed only in the first region 61.

As described above, the compressed air directly flows into the combustion chamber 18 if the through holes 51 are disposed in the second region 62. Thus, disposing many through holes 51 in the second region 62 more than necessary is not preferable in terms of efficiency of the gas turbine 1. In this regard, if the plurality of through holes 51 are formed only in the first region 61 and the through holes 51 are not disposed in the second region 62, it is possible to suppress a decrease in efficiency of the gas turbine 1.

With the combustor 3 according to at least one embodiment of the present invention, including the burner 15 for combusting the fuel, and the combustion liner 12 and the transition piece 14 which are respectively the combustor components, it is possible to cool the vicinity of the weld part 50 where the temperature is likely to be high, while suppressing inflow of the compressed air to the combustion chamber 18. Moreover, since the configuration need not be adopted in which the refrigerant jacket for covering the weld part 50 from the outer circumferential side of the combustion liner 12 along the extending direction of the weld part 50 is disposed, and the compressed air or the like is caused to flow in the refrigerant jacket, it is possible to cool the vicinity of the weld part 50 with the simple configuration.

With the gas turbine 1 according to at least one embodiment of the present invention, including the compressor 2 for generating the compressed air, the combustor 3, and the turbine 4 which is rotary driven by the combustion gas generated by the combustor 3, it is possible to cool the vicinity of the weld part 50 where the temperature is likely to be high, while suppressing inflow of the compressed air to the combustion chamber 18. Moreover, since the configuration need not be adopted in which the refrigerant jacket for covering the weld part 50 from the outer circumferential side of the combustion liner 12 along the extending direction of the weld part 50 is disposed, and the compressed air or the like is caused to flow in the refrigerant jacket, it is possible to cool the vicinity of the weld part 50 with the simple configuration.

(Manufacturing Method for Combustor Component)

Hereinafter, a manufacturing method for a combustor component according to some embodiments described above will be described.

Figure 10:
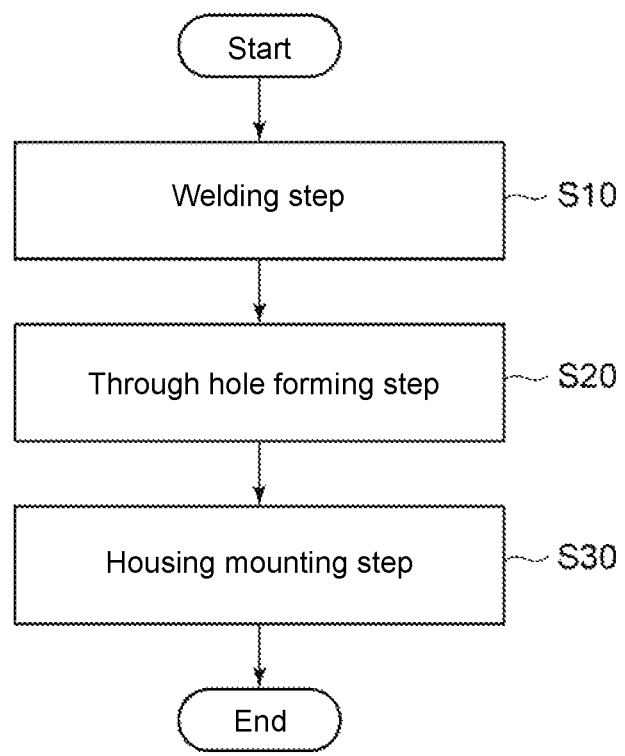
FIG. 10 is a flowchart showing a procedure in a manufacturing method for a combustor component according to some embodiments.

FIG. 10 is a flowchart showing a procedure in the manufacturing method for the combustor component according to some embodiments described above. The manufacturing method for the combustor component according to some embodiments includes a welding step S10, a through hole forming step S20, and a housing mounting step S30.

The welding step S10 is a step of forming the cylindrical body 12*a* internally including the combustion chamber 18, by joining the plurality of sections 121 via the weld part 50.

First, prior to the welding step S10, the acoustic hole 28 is formed in a plate-like member internally forming the cooling passage 40, and the plurality of sections 121 each being processed into a shape corresponding to the section 121 are created in advance. Then, in the welding step S10, the end portions of the plurality of sections 121 are joined to each other by welding.

The through hole forming step S20 is a step of forming the plurality of through holes 51 opening to the combustion chamber 18 in the weld part 50. In the through hole forming step S20, the plurality of through holes 51 are formed in the weld part 50 of the cylindrical body 12*a* by using, for example, an electric drill or the like. In the through hole forming step S20, the plurality of through holes 51 are formed have the same formation position, the same number of formations, and the like as the plurality of through holes 51 in the cylindrical body 12*a* according to some embodiments described above.

The formation density of the thus formed plurality of through holes 51 is higher in the first region 61 than in the second region 62.

The housing mounting step S30 is a step of disposing the housing 22, which defines the acoustic damping space 32 communicating with the combustion chamber 18 via at least one through hole 51, on the outer circumferential side of the cylindrical body 12*a* to cover a part of the weld part 50. In the housing mounting step S30, the housing 22 is fixed to the cylindrical body 12*a* by, for example, welding.

As described above, the compressed air directly flows into the combustion chamber 18 if the through holes 51 are disposed in the second region 62. Thus, disposing many through holes 51 in the second region 62 more than necessary is not preferable in terms of efficiency of the gas turbine 1. In this regard, with the manufacturing method for the combustor component according to some embodiments described above, since the formation density of the through holes 51 in the weld part 50 is higher in the first region 61 than in the second region 62, it is possible to manufacture the combustor component capable of cooling the vicinity of the weld part 50 where the temperature is likely to be high, while suppressing inflow of the compressed air to the combustion chamber 18. Moreover, since the configuration need not be adopted in which the refrigerant jacket for covering the weld part 50 from the outer circumferential side of the combustion liner 12 along the extending direction of the weld part 50 is disposed, and the compressed air or the like is caused to flow in the refrigerant jacket, it is possible to manufacture the combustor component capable of cooling the vicinity of the weld part 50 with the simple configuration.

If the through holes 51 are disposed in the weld part 50 in an existing combustor component, in order to suppress a change in percentage of an opening area in the above-described region 26, it is desirable to close the existing acoustic holes 28 in correspondence with an opening area increased by adding the through holes 51.

The present invention is not limited to the above-described embodiments, and also includes an embodiment obtained by modifying the above-described embodiments and an embodiment obtained by combining these embodiments as appropriate.

For example, in some embodiments described above, the through holes 51 in the combustion liner 12 has mainly been described. However, the present invention may be applied to the transition piece 14. Moreover, if the combustor 3 includes a combustion tube and a swirler support tube, the present invention may be applied to at least the combustion tube.

In some embodiments described above, the acoustic device 20 is the acoustic device referred to as the so-called acoustic liner. However, the present invention is also applicable to a case in which the acoustic device 20 is a so-called acoustic damper.

REFERENCE SIGNS LIST

1 Gas turbine
2 Compressor
3 Combustor
4 Turbine
12 Combustion liner
12a Cylindrical body
14 Transition piece
14a Tubular body
15 Burner
18 Combustion chamber
20 Acoustic device
22 Housing
28 Acoustic hole
32 Acoustic damping space
40, 41, 43, 44 Cooling passage
50 Weld part
51 Through hole
61 First region
62 Second region
121 Section

The invention claimed is:

1. A combustor component comprising:
a cylindrical body which internally includes a combustion chamber, and includes a weld part where a plurality of through holes opening to the combustion chamber are formed; and
a housing which is disposed on an outer circumferential side of the cylindrical body to cover a part of the weld part, and defines an acoustic damping space communicating with the combustion chamber via at least one of the through holes,
wherein the weld part includes a first region covered with the housing and a second region positioned outside the housing, the plurality of through holes being formed in the first region at a higher density than in the second region.

2. The combustor component according to claim 1,
wherein the housing extends along a circumferential direction of the cylindrical body, and
wherein the weld part at least partially extends along an axial direction of the cylindrical body.

3. The combustor component according to claim 1,
wherein the acoustic damping space communicates with the combustion chamber via the through holes disposed in the first region of the weld part, and a plurality of acoustic holes disposed separately from the through holes in the cylindrical body and opening to the combustion chamber.

4. The combustor component according to claim 3,
wherein at least some of the plurality of through holes are arranged at a first pitch along an axial direction of the cylindrical body, and
wherein at least some of the plurality of acoustic holes are arranged at a second pitch along the axial direction, the second pitch being not less than 70% and not greater than 130% of the first pitch.

5. The combustor component according to claim 1,
wherein the cylindrical body forms a plurality of cooling passages at intervals along a circumferential direction of the cylindrical body, the cooling passages extending along an axial direction of the cylindrical body inside a wall constituting the cylindrical body.

6. The combustor component according to claim 5,
wherein the acoustic damping space communicates with the combustion chamber via the through holes disposed in the first region of the weld part, and a plurality of acoustic holes disposed separately from the through holes, and
wherein the plurality of acoustic holes are formed between two of the cooling passages adjacent to each other in the circumferential direction.

7. The combustor component according to claim 5,
wherein the cooling passages include: a first pair of the cooling passages arranged across the weld part in the circumferential direction; and a second pair of cooling passages adjacent to each other in the circumferential direction, and
wherein the first pair of the cooling passages is arranged in the circumferential direction at a first interval larger than a second interval at which the second pair of the cooling passages is arranged in the circumferential direction.

8. The combustor component according to claim 1,
wherein the plurality of through holes are formed only in the first region.

9. A combustor component, comprising:
a cylindrical body forming a plurality of weld parts for welding, along an axial direction, circumferential end portions of a plurality of plate-like sections divided in a circumferential direction, respectively and internally forming a tubular combustion chamber; and
a housing covering the cylindrical body from an outer circumferential side along the circumferential direction,
wherein, in each of the plurality of plate-like sections, the cylindrical body forms a plurality of acoustic hole rows in the circumferential direction each in which a plurality of acoustic holes opening to a combustor are disposed in a row in the axial direction,
wherein the housing covers the plurality of acoustic hole rows, as well as covers a part of a corresponding one of the plurality of plate-like sections and a part of a corresponding one of the plurality of weld parts, and defines an acoustic damping space for damping a combustion oscillation in communication with the combustion chamber via the acoustic hole rows, and
wherein, in the part of the corresponding one of the plurality of weld parts covered with the housing, a plurality of through holes are formed along the axial direction.

10. A combustor, comprising:
a burner for combusting fuel; and
the combustor component according to claim 1.

11. A gas turbine, comprising:
a compressor for generating compressed air;
the combustor according to claim 10; and
a turbine which is rotary driven by a combustion gas generated by the combustor.

12. A manufacturing method for a combustor component, the method comprising:

a step of forming a cylindrical body internally including a combustion chamber, by joining a plurality of sections via a weld part;
a step of forming a plurality of through holes opening to the combustion chamber in the weld part; and
a step of disposing a housing on an outer circumferential side of the cylindrical body to cover a part of the weld part, the housing defining an acoustic damping space communicating with the combustion chamber via at least one of the through holes,
wherein the weld part includes a first region covered with the housing and a second region positioned outside the housing, the plurality of through holes being formed in the first region at a higher density than in the second region.

* * * * *